Dec. 31, 1940.    H. G. LUBSZYNSKI    2,227,097
ELECTRON TUBE APPARATUS
Filed May 28, 1936
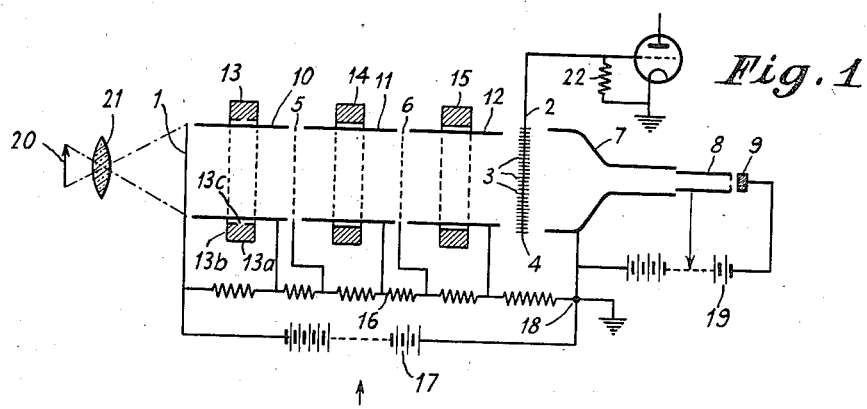
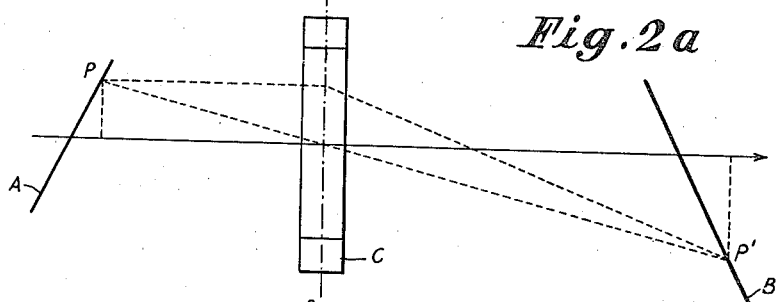
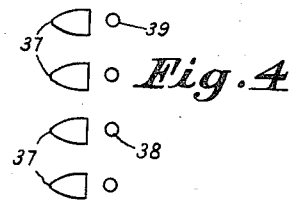
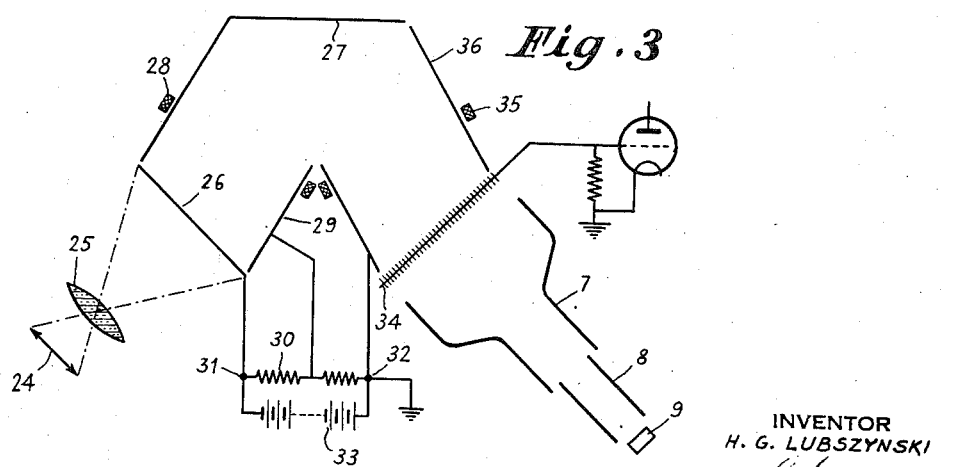
INVENTOR
H. G. LUBSZYNSKI
ATTORNEY Patented Dec. 31, 1940

2,227,097

UNITED STATES PATENT OFFICE 2,227,097

ELECTRON TUBE APPARATUS

Hans Gerhard Lubszynski, Hillingdon, England, assignor to Electric & Musical Industries Limited, Hayes, England, a company of Great Britain Application May 28, 1936, Serial No. 82,300
In Great Britain May 30, 1935

19 Claims. (Cl. 178—7.2)

The present invention relates to electron discharge apparatus for use in television, for example and is related to and an improvement of the invention described and covered by my copending application for a United States Patent, Serial No. 19,752, filed May 4, 1935 and entitled "Television."

In British patent specification No. 442,666, which covers the invention described and disclosed in my above identified copending application, there is described a method of and apparatus for transmitting images of an object to a distance wherein an optical image of the object to be transmitted is projected upon a photo-electrically active screen, primary or photo-electrons emitted from said photo-electrically active screen are accelerated towards a mosaic screen of mutually insulated elements and are focused upon the mosaic screen to form an electrostatic image thereon by means of an electron lens system, and said mosaic screen is scanned by a cathode ray beam.

It is evident that the apparatus used in the above method may also be adapted to other purposes by replacing the mosaic screen by a fluorescent screen, when an image of the object will appear thereon. This apparatus may be used for converting light of one range of frequency into light of another range of frequency; for example the rays forming the image on the photo-electrically active screen may be in the infra-red region of the spectrum, and will then appear as an image in the visible spectrum. Such apparatus has applications in seeing through fog. In other applications the focusing system between the photo-electrically active screen and the fluorescent screen may be adjusted to give on the latter screen a magnified or reduced image of the image on the former screen. In this form the apparatus has applications to micro-photography.

It is found however that the intensity of the image formed on the fluorescent screen is almost unavoidably less intense than the image on the photo-electrically active screen, unless unmanageably high potentials are to be used to accelerate the electrons between the two screens.

It is an object of the present invention to provide an improved electron discharge apparatus for use for the above and similar purposes.

According to one feature of the present invention there is provided a method of image amplification comprising the steps of projecting an image of an object upon a first screen adapted to emit primary electrons under the influence of the rays forming said image, accelerating said primary electrons towards and focusing them upon a target electrode adapted to emit secondary electrons under bombardment by said primary electrons, the incident velocity of said primary electrons in relation to the nature of said target electrode being made such that the number of secondary electrons emitted is greater than the number of incident primary electrons, and accelerating said secondary electrons towards and focusing them upon a second screen so as to form thereon an electrostatic or electron image of the first named image.

According to a further feature of the present invention there is provided a method of transmitting images of an object to a distance comprising the steps of focusing an image of the object to be transmitted upon a photo-electrically active screen, accelerating the primary electrons emitted from said screen towards a target electrode and focusing them thereon, the incident velocity of said primary electrons upon said target electrode being made such, in relation to the nature of said target electrode, that secondary electrons are emitted therefrom in number greater than the number of incident primary electrons causing said secondary electrons or other secondary electrons liberated under the influence thereof in one or more further stages of electron multiplication, to be accelerated towards and focused upon a mosaic screen to form thereon an electrostatic image of the first named image and scanning said screen to produce picture signal currents.

According to yet a further feature of the present invention there is provided an electron discharge device suitably for carrying out the above methods, said device comprising means whereby an electron image of an object may be projected on a target electrode adapted to emit secondary electrons under impact of the electrons forming said electron image, and means for focusing secondary electrons emitted from said target electrode on to a screen positioned to receive said secondary electrons whereby an electrostatic or a further electron image is formed thereon.

When electrons are focused on to a screen, the nature of the image formed depends on the nature of the screen. If the screen has the form of a mosaic screen comprising a large number of mutually insulated elements, each element acquires and retains a charge proportional to the number of incident electrons falling upon it. Similar conditions exist when the screen is of insulating material, such for example as mica. This image is hereinafter termed an electrostatic image. If however, the electrons are focused on to a conducting electrode, no electrostatic image can be formed, since no charges are retained on the electrode. At any instant, however, there is an electron "pattern" on the electrode corresponding to the focused beam of electrons, and this electron pattern may be termed an electron image. It will be understood that by focusing an electron image on a mosaic screen, an electrostatic image results.

Further features of the present invention will be apparent from the following description and appended claims.

The invention will be described with reference to the accompanying diagrammatic drawing in which Fig. 1 shows a form of television transmitting apparatus according to the present invention, Figs. 2a and 2b are explanatory diagrams.

Fig. 3 shows a further form of television transmitting apparatus according to the present invention, and Fig. 4 shows a preferred form of grid structure which may be used with the apparatus of Fig. 1.

Referring to Fig. 1, television transmitting apparatus comprises a thin transparent photo-electrically active screen 1, and a mosaic screen 2 which has the form of a multiplicity of metallic rivets 3 projecting through and insulated from a conducting signal plate 4. Between the photo-electrically active screen 1 and the mosaic screen 2 are arranged two fine wire-mesh grids 5, 6, referred to hereinafter as target electrodes. On the side of the mosaic screen 2 remote from the photo-electrically active screen 1 is arranged a cathode ray gun comprising two anodes 7 and 8 and a cathode 9. Obviously a more complex electrode system may be used. Deflecting means (not shown) are provided for causing a beam of electrons from the gun to scan the mosaic screen 2.

Surrounding the space between the screen 1 and the target 5, between the targets 5 and 6 and between the target 6 and the mosaic screen 2 are arranged screening electrodes 10, 11 and 12 respectively, which may have the form of metal cylinders. The screening electrodes 10 and 11 may be connected to the following target electrodes 5 and 6 if desired or may be insulated therefrom as shown. The screening electrodes 10, 11 and 12 and the target electrodes 5 and 6 are held relatively to electrode 1 at potentials which increase as their distance from electrode 1 increases.

For this purpose there is provided a potentiometer 16 connected across a battery 17. The positive terminal 18 of the potentiometer 16 is connected to earth and to the second anode 7 of the electron gun. A difference of potential is maintained between anodes 7 and 8 and the cathode 9 of the gun by means of a battery 19 for example. Clearly, in the case where the screening electrodes 10 and 11 are connected to the target electrodes 5 and 6 the connections from the screening electrodes to the potentiometer 16 are omitted.

Outside the screening electrodes 10, 11 and 12 are arranged magnetic focusing coils 13, 14, 15. These are shown as being of the shielded type, that is coils designed to produce a magnetic field which extends effectively only a small distance in the axial direction. These coils each consist of an ordinary wire-wound coil covered by a shield of magnetic material in which there is an annular gap in the inside surface. These details are indicated in the coil 13, the coil itself being denoted by reference 13a, the shield by reference 13b and the gap by reference 13c. The coils 14 and 15 are preferably formed in the same manner. The invention however is not limited to the use of coils of this kind. The coils may have the form of ordinary unshielded coils which are also of small axial length or they may take the form of solenoids which extend over the whole distance between two adjacent electrodes or screens, for example the whole distance between the screen 1 and the target electrode 5. With solenoids it is not possible to obtain any magnification or diminution of the image formed, since the field produced is uniform, whereas with short coils, of the shielded or unshielded types, magnification or diminution of the image may be obtained. These two latter types influence a beam of electrons in a manner which corresponds more closely to the influence of an optical lens on a light beam.

In practice the cathode ray gun 7, 8, 9, the electrodes 10, 11, 12 and screens 1 and 2 and target electrodes 5 and 6 are enclosed in an evacuated glass or the like envelope. The photo-electrically active screen 1 may then be formed on the inner wall of the envelope. The coils 13, 14 and 15 may be placed outside the envelope.

The operation of the apparatus above described is as follows. An optical image of an object 20 to be transmitted is focused by means of an optical system shown diagrammatically at 21 on to the photo-electrically active screen 1. Primary electrons emitted from the screen 1 are accelerated towards the target electrode 5 owing to the potential differences existing between the screen 1 and the electrode 10 and the target electrode 5. An electron image of the screen 1 is focused on the target electrode 5 by means of the magnetic focusing coil 13. The velocity of the primary electrons incident on the target electrode 5 is made such, relative to the material of which the target is composed, that the number of secondary electrons which are caused to be emitted from the target 5 by the incident primary electrons is greater than the number of the primary electrons.

Between the target electrode 5 and the target electrode 6 there exists an electrostatic field, which penetrates to a small extent through the interstices of the mesh of which the target electrode 5 is composed. Secondary electrons liberated from the surface of the target electrode 5 are drawn through the interstices of the mesh by the penetrating field and are then accelerated towards the target electrode 6, on to which they are focused by the magnetic field generated by the coil 14.

These secondary electrons from the target electrode 5 acting as primary electrons on the target electrode 6 liberate from the target electrode 6 secondary electrons which are greater in number than the incident primary electrons. This secondary emission is drawn through the interstices of the mesh in the target electrode 6 by the electrostatic field existing between the target electrode 6 and the elements 3 of the mosaic screen 2, the potential of which is always in the neighbourhood of earth potential. The secondary electrons from the target electrode 6 are then accelerated towards the mosaic screen 2 and focused thereon by means of the magnetic field set up by the coil 15. In this way there is formed an electrostatic image on the mosaic screen 2.

The velocity of impact of the electrons from the target electrode 6 upon the mosaic screen 2 and the nature of this screen may be such that the arriving electrons liberate either a greater or a smaller number of secondary electrons from the elements 3 of the screen 2. In the former case the mosaic elements 3 will become more positive and in the latter case more negative with increase in picture brightness.

The cathode ray may be arranged to bring the potential of each mosaic element 3, when scanned, to a datum potential which is close to the potential of the second anode 7 and therefore to earth. This datum value is stable when the number of primary electrons arriving at an element from the cathode ray is equal to the number of secondary electrons passing from the element 3 to the anode 7. The discharge of the elements gives rise to picture signal voltages across the resistance 22 and these voltages are amplified for example by a valve 23 and transmitted.

Alternatively, each mosaic element may be brought by the scanning beam to a datum potential which is close to the potential of the cathode 9. To this end the cathode 9 is connected to earth, and the connection to earth at the terminal 18 of the potentiometer omitted. In this arrangement a grid, held at a positive potential relative to earth, may, if desired, be placed between the second anode 7 and the mosaic screen 2. The mode of operation of such apparatus is fully described in copending application, U. S. Serial No. 34,304, filed August 2, 1935, of A. D. Blumlein, et al.

The target electrodes 5 and 6 may have the form of grids formed of wires of circular cross-section. A preferred form of grid structure for the target electodes is, however, illustrated in Fig. 4. In this preferred form the wires 37 of the target electrode have a cross-section which is tapered somewhat as shown towards the source of the incident electrons. The effect of this shaping of the cross-section of the wires of the grid is to cause most of the secondary electrons to be emitted in directions which are nearer to the direction in which it is desired to accelerate them than would be the case with wires of circular cross-section.

The shape of the cross-section of the wires which will bring about this effect is not limited to the particular form shown in the drawing. In the case where the wires are of circular cross-section the major part of the surface of the grid faces the incident electrons approximately normally, and the mean angle of emission of secondary electrons is opposed to the direction in which they are finally required to travel. It is, therefore, preferable that the cross-section of the wires of the grid forming the target electrode is of a shape approaching a parabola or ellipse or a triangle with its apex facing the incident primary electrons.

By the term "tapered cross-section" is to be understood any shape of the kind indicated above. The shape of the surface of the grid facing away from the source of incident electrons is immaterial, and may be made plane as shown at 38.

Behind the target electrode there may be placed a further grid indicated at 39 in Fig. 4, arranged with the wires or like solid parts thereof in alignment with those of the target electrode. This grid is held at a positive potential with respect to the target electrode and serves to increase the fraction of emitted secondary electrons passing through the grid target electrode.

The apparatus has been described as having two stages of electron amplification between the photo-electrically active screen 1 and the mosaic screen 2. The invention is not limited to two stages only; any suitable number of stages of amplification may be used. With wire mesh screens as target electrodes however, the number of stages of amplification is limited since loss of definition occurs at each stage owing to the finite size of the interstices of the mesh. This loss of definition may be lessened by using thin conducting target electrodes which are permeable to electrons, for example, very thin sheets of metal foil.

In the example described, the electrons liberated from the mosaic elements 3 by the electrons arriving from target 6 are collected by the electrode 12. If desired this electrode may be connected directly to the earthed end 18 of the potentiometer.

There may be provided instead of or in addition to the magnetic focusing coils 13, 14 and 15, electrostatic focusing means for focusing the electrons between stages. The electrostatic focusing means may take the form of conductive cylinders arranged co-axial with the tube and maintained at suitable potentials to produce the required focusing effect.

If desired the mosaic screen 2 may be replaced by a sheet of material, such as mica, having a high transverse resistance. In this case the screen must be scanned on the side thereof facing the target electrode 6, the scanning being carried out obliquely to the screen. A substitute of this kind for a normal mosaic screen is to be regarded as a mosaic screen for the purposes of this specification.

In a second embodiment of the present invention the loss of definition due to the mesh structure of the target electrodes is overcome by making the target electrodes continuous and focusing the secondary electrons from one target electrode on to another placed on the same side of the first target electrode as the photo-electrically active screen.

In the specification of co-pending application, U. S. Serial No. 28,790, filed June 28, 1935, James D. McGee, there is described an electron discharge amplifier in which secondary emission effects are used to produce current amplification. One of the forms of apparatus described in that specification comprises a zig-zag tube, at each bend of which is arranged a target electrode. The target electrodes are parallel to one another and are held at potentials which increase successively from one target electrode to the next. Electrons from a source are caused to impinge on the electrode at the lowest potential, from which secondary electrons are emitted in number greater than the incident primary electrons. These secondary electrons impinge on the target at the next highest potential, to cause a further amplification. The electrons are finally collected by an output electrode. Means are provided surrounding the electron paths between the targets for concentrating the beam of electrons. Such means may take the form of magnetic coils.

Amplification of a beam of electrons from a photo-electric surface on which an optical image is formed may be brought about in a similar way, by forming successive electrostatic images from one target to the next, the path of the current being of a zig-zag shape. In such an arrangement however the plane of the target from which electrons are emitted and the plane of the target on which they are focused are not perpendicular to the plane of the axis of the electron lens system which effects the focusing. This is not material in the case with which the earlier application above mentioned is concerned because there it is not necessary to produce focused images but merely concentration of electrons.

The way in which a well focused image may be formed on electrodes which are oblique to the axis of the electron lens will be explained with referenec to Figs. 2a and 2b.

Referring to those figures, A and B are two electrodes, and it is required to focus electrons emitted from any point on the electrode A on to a point on the electrode B by means of a magnetic focusing coil C.

First, the configuration of the surface of the electrode B, must be calculated for the case where electrode A is plane as shown.

A point P on the surface of the electrode A may be represented by co-ordinates the abscissa of which is given by the axis of the lens C, the centre of the lens being taken as the origin. The plane A will be taken as cutting the abscissa in $x_0$.

The photo-electrons from P (co-ordinates $(x, y)$) are to be focused on the point P' on the screen B, the plane of which cuts the abscissa in $x'_0$ and the point P' having co-ordinates $(x', y')$.

The equation of the line, which is formed by the intersection of the photo-cathode A with the plane of the paper in Fig. 2a is:

$$y = m(x - x_0) \quad (1)$$

where $m = \tan \alpha$ and is the angle between the plane of electrode A and the abscissa. From the lens formula the following relation is obtained, viz:

$$-\frac{1}{x} + \frac{1}{x'} = \frac{1}{f} \quad (2)$$

where $f$ is the focal length of the electron lens defined in the manner usual in optical lens formulae.

From the figure it is clear that $$\frac{y}{x} = \frac{y'}{x'} \quad (3)$$

Now by putting $$x = \frac{fx'}{f - x'}$$

from (2) and $$y = \frac{xy'}{x'}$$

from (3) into (1)

$$\frac{fy'}{f - x'} = m\left(\frac{fx'}{f - x'} - x_0\right)$$

or $$y' = m\left(x' - \frac{f - x'}{f}x_0\right)$$

$$= m\left(1 + \frac{x_0}{f}\right)\left(x' - \frac{fx_0}{f + x_0}\right)$$

whence $y' = m'(x' - x'_0)$ which is the equation of a straight line inclined to the axis at the angle $\alpha'$, where $$\tan \alpha' = m' = m\left(1 + \frac{x_0}{f}\right)$$

and the intersection with the abscissa is $$x'_0 = \frac{fx_0}{f + x_0}$$

Therefore the equation of the line which is formed by the intersection of the surface B with the plane of the paper is a straight line inclined to the axis O—O at an angle $\alpha'$, and the surface B is therefore a plane surface. In the case of a 1:1 projection ratio $$x_0 = -x'_0 = -2f$$
$$m' = -m$$
$$\alpha' = 180° - \alpha \quad (4)$$

This relation (4) has been deduced without any assumption as to the nature of the electron lens. Though in Figure 2 a magnetic electron lens is shown, the equation (4) is equally applicable to the case where focusing is brought about by an electrostatic field. Such a field may be produced between two cooperating electrodes, which may have the form described in co-pending application, U. S. Serial No. 48,348, filed November 5, 1935, of Leonard F. Broadway.

The orientation of the surface B has been deduced on the assumption, which is in general found to be true, that an electron lens system focuses a beam of electrons according to laws similar to those which hold for the focusing of a light beam by an optical lens. As is well known, an object on the surface A would be focused by an optical lens at C on to the surface B to form a distorted image thereon. Dimensions of the object parallel to the plane of the paper would suffer distortion in the form of an increase or decrease in length, the amount of distortion of any small length being dependent on the distance of that length from the axis of the lens. Dimensions at right angles to the plane of the paper would not suffer distortion. A similar effect occurs in the case of the electron lens; a distorted image of the surface A being formed on the surface B.

Now, in forming an electron image on a surface by means of a magnetic lens, the image is not upside down, as in light optics, but rotated through an angle with respect to the object, which is in the present case the picture projected on to the photo-cathode A. The focal length $f$ of a magnetic lens C and the angle $\theta$, through which the image is rotated, are given by the expressions $$1/f = \frac{0.022}{v} H^2 dz; \text{ and } = \frac{0.15}{v} H dz$$

where $v$ is the velocity of the electrons, and H the magnetic field strength along the axis O—O. The field strength along the axis of a magnetic lens follows the dotted line D in Fig. 2b, in which is plotted H as ordinate and $z$ the distance from the central plane of the coil as abscissae. It can be replaced approximately by the simplified form shown by the full line E, which is so arranged that the area enclosed by it and the abscissa is equal to the area enclosed by the curve D and the abscissa. The limits of the line E will be referred to as $z_1$ and $z_2$. Then it follows that $$Hdz = H(z_2 - z_1)$$

and $H^2 dz$ is approximately equal to $H^2(z_2 - z_1)$. Therefore with the assumption that $$H^2 dz = H^2(z_2 - z_1)$$

$$\frac{1}{f} = \frac{0.022}{v} \cdot H^2(z_2 - z_1)$$

$$2 = \frac{0.025}{v} \cdot H^2(z_2 - z_1)^2$$

whence $$\frac{v}{.022 H^2 f^2}$$

is approximately equal to
whence is approximately equal to $$\frac{z_2 - z_1}{f} \quad (5)$$

When the length of a magnetic coil is at least equal to the distance between object and image, i. e. when object and image surfaces are within a solenoid, there can be no lens effect produced since the field is a uniform one. A lens effect depends on the production of an electron deflecting field which increases with distance from the axis of the electrode system outwards. If a short coil is to be used $z_2-z_1$ must be made considerably less than the distance between object and image, that is less than $(x_0+x'_0)$. Suppose $$x_0+x'_0=n(z_2-z_1)$$

In the case where $x_0=x'_0$, from the ordinary lens formula $x_0=2f$, and therefore $n(z_2-z_1)=4f$ or $$=\frac{4f}{nf}=\frac{4}{n}$$

In practice it is often convenient to have $x'_0=x_0$, since in that case no magnification takes place.

In one example of application of the above formula the distance between object and image $x_0+x'_0$ is made approximately 4 times the lens width, and then $=1$ radian or about 57°.

In Fig. 3 there is illustrated the application of the zig-zag electron amplifier to the present invention.

Referring to Fig. 3, an image of an object 24 is projected by an optical system shown diagrammatically at 25 on to a transparent photo-electrically active screen 26. A target electrode 27 is arranged on the side of the screen 26 remote from the optical system 25, and inclined to the latter at a suitable angle calculated from the formula given above, so that electrons passing from the screen 26 are focused on the screen 27 by means of the magnetic coil lens 28. Surrounding the space between the screens 26 and the target electrode 27 is arranged an electrode 29 of circular cross-section, preferably connected to the target 27. A potential difference is applied between the screen 26 and the target 27 by connecting these electrodes across a portion 30 of a potentiometer 31, 32 through which a current from a source of current 33 passes.

On the side of the target electrode 27 which faces the photo-electrically active screen 26 there is provided a mosaic screen 34 arranged at such an angle to the target electrode 27 that electrons emitted by the latter are focused thereon by means of the coil 35. An electrode 36 surrounds the space between the mosaic screen 34 and the target 27, and is connected to earth and the positive terminal of the source of current 33. The mosaic screen is scanned on the side remote from the screen 27 by a beam of electrons from a suitable cathode ray gun 7, 8, 9, scanning motion being given to the beam by suitable deflecting means not shown.

The operation of this tube is as follows:

Under the action of light from the object 24 electrons are emitted from the screen 26, and are accelerated towards the target electrode 27 as a result of the electrostatic field set up between the screen 26 and the target 27. The magnetic coil 28 serves to focus the electrons emitted from the screen 26 on to the target 27 to form an electron image thereon. This target 27 is covered with a material such as caesium which emits a large number of secondary electrons when bombarded by primary electrons of suitable velocity—for example ten secondary electrons may be emitted for every primary electron incident on the target. Thus when the electrons from the screen 26 impinge on the target electrode 27, a beam of electrons is emitted from the target 27 which beam is an amplified reproduction of the beam emitted from the screen 26. This beam is then focused on to the mosaic screen 34, the emission of secondary electrons from the elements thereof (if the electron velocity is arranged to be suitable) resulting in a further stage of amplification. In the embodiment of the invention described with reference to Fig. 3 only one stage of electron amplification has been shown apart from any amplification that may be obtained by secondary emission from the mosaic screen. However, as many stages as is desired may be used. Thus the mosaic screen 34 of Fig. 3 may be replaced by a second target electrode, and electrons emitted therefrom accelerated towards and focused upon a third target electrode, from which the emitted electrons may be focused on to a mosaic screen. This embodiment of the invention is particularly adapted to multi-stage amplification since very accurate focusing may be obtained with magnetic coils, and very little loss of definition takes place at each stage.

Figure 3 is drawn as if the axes of the focusing coils 28 and 35 lay in the same plane. This has been done in order to simplify the drawing, but it will be clear from the information afforded by Equation 5 calculated above, that, where focusing is carried out by means of electromagnetic electron lenses, the axes of the coils 28 and 35 will lie in different planes. Thus if the plane of the figure contains the axis of the coil 28, the axis of the coil 35 will be at an angle to the plane of the paper and the plane of the paper will cut the coil 35 at points which are not diametrically opposite one another. The axis of the cathode ray tube will also be inclined to the plane of the paper, and the mosaic screen will be suitably positioned relative to the coil 35. The precise relative positions in space of the various electrodes and coils will readily be calculated from the information already given. Where electrostatic focusing means are used in place of the coils 28 and 35, the screens 26 and 34 and the target electrode will all lie normally to the plane of the paper in the positions indicated in Fig. 3.

As has already been mentioned, at each stage of amplification the electron image formed on one target electrode or the electrostatic image on the mosaic screen is a distorted image of the preceding target electrode (or of the photo-electrically active surface 26). By suitably positioning the electrodes relatively to one another it may be arranged that the distortion occurring in one stage of the focusing "cancels out" that due to the preceding stage, so that where an even number of focusing operations are performed an undistorted final electrostatic image may be formed. Alternatively the wave form of the potential or current serving to deflect the scanning cathode ray beam over the screen may be given a suitable form, such that the spacing of the scanning lines effectively removes the effect of distortion.

As an alternative to altering the wave form of the scanning potentials or currents, the axis of the cathode ray tube may be inclined to the mosaic screen, so that the cross-sectional area of the scanning spot varies as the scanning beam moves over the screen. It will be clear that in the apparatus of Fig. 3 either electromagnetic or electrostatic focusing means or a combination of both may be used.

The present invention is not limited to apparatus in which a final electrostatic image is formed on a mosaic screen. For example, in one known form of television transmitting tube an optical image of an object to be transmitted is projected upon a photo-electrically active screen. The photo-electrons emitted from this screen are accelerated towards and focused upon a plane electrode having in the centre a small aperture. The electron image formed on the surface of this plane electrode is swept over the aperture with a scanning motion by means of deflecting coils or plates; the electrons passing through the aperture are collected on an output electrode and the current constituted thereby is amplified and transmitted. The present invention may be applied to this system, for example by replacing the mosaic screen 2 or 34 of Figs. 1 or 3 respectively and the associated cathode ray gun 7, 8, 9 by a plane electrode having a small aperture. This electrode is maintained at a positive potential with respect to the preceding target electrode, and behind the aperture is an output electrode, the potential of which may be above that of the plane electrode. Suitable means are provided between the plane electrode and the preceding target electrode for sweeping the electron image over the aperture. Such means may comprise electro-magnetic deflecting coils.

In an alternative arrangement the mosaic screen may be replaced by a fluorescent screen, the apparatus then forming a light amplifier by means of which an image cast upon the photosensitive screen may be caused to produce an optical image of greater brightness upon the fluorescent screen. The invention in this aspect has application to micro-photography, where often the highly magnified optical image of an object is of too feeble intensity for photographic purposes. If the photo-sensitive screen is sensitive to infra-red or ultra-violet light, an image of an object emitting only invisible radiation (for example a warm body in a dark room) may be made visible. The invention in this aspect has applications for example to seeing through fog.

In another application an image formed on the photo-electrically active screen in one colour (for example red) may by suitable choice of the material of the fluorescent screen, result in an image in a different colour (for example blue). Used in this way the apparatus may be referred to as a "light transformer." In a practical application, an object only emitting infra-red rays, for example, may be photographed on a plate insensitive to these rays by the interposition, between the object and the plate, of the "light transformer" used in conjunction with suitable optical apparatus.

If desired a photographic plate or film may replace the mosaic screen in either of the embodiments illustrated.

In the above description and in the following claims the term "optical image" is not limited to an image formed by visible radiation, but is intended to include an image formed by any electromagnetic radiation which are capable of causing the emission of electrons from a screen sensitive thereto.

Having described my invention, what I claim as new and desire to secure by Letters Patent is:

1. The method of transmitting images of an object which includes the steps of producing an optical image of the object, releasing photoelectrons by the produced optical image to form a primary electron image of the produced optical image, producing an intensified electron image from the primary electron image by releasing secondary electrons under the control of the primary electron flow, and producing an electrostatic image from the produced intensified electron image.

2. The method of transmitting images of an object which includes the steps of producing an optical image of the object, releasing photoelectrons by the produced optical image to form a primary electron image of the produced optical image, producing an intensified electron image from the primary electron image by releasing secondary electrons under the control of the primary electron flow, producing an electrostatic image from the produced intensified electron image, and scanning the electrostatic image to produce electrical signalling energy.

3. The method of transmitting images of an object which includes the steps of producing an optical image of the object, releasing photoelectrons by the produced optical image to form a primary electron image of the produced optical image, producing a first secondary electron image under the control of the produced primary electron image, producing a second secondary electron image under the control of the first produced secondary electron image, and then converting the second produced secondary electron image into an electrostatic image of the primary electron image.

4. The method of transmitting images of an object which includes the steps of producing an optical image of the object, releasing photoelectrons by the optical image to form a primary electron image of the produced optical image, producing a first electron image on to the control of the produced primary electron image, producing a second secondary electron image under the control of the first produced secondary electron image, converting the second produced secondary electron image into an electrostatic image of the primary electron image, and scanning the electrostatic image to produce electrical signalling energy representative of the optical image.

5. The method of transmitting an electrical representation of an object which comprises the steps of producing an optical image of the object, releasing electrons under the control of the optical image to form a primary electron image from the optical image, focusing the produced primary electron image at a predetermined plane, releasing secondary electrons at the predetermined plane under the control of the primary electron flow to produce an intensified electronic replica of the optical image, and then focusing the produced intensified electronic replica of the optical image upon a second predetermined plane to produce an electrostatic replica of the secondary electron replica.

6. The method claimed in claim 5 wherein the produced electron images are both electromagnetically and electrostatically focused at the predetermined planes.

7. The method claimed in claim 5 comprising the additional step of electronically scanning the produced electrostatic replica of the optical image to produce electrical signalling energy representative of the object.

8. The method of transmitting images of an object which comprises the steps of producing an optical image of the object on a predetermined plane, releasing electrons onto the control of the optical image to form a primary electron image from the optical image, focusing the electron image upon a predetermined plane in non-parallel relation to the first named plane, releasing secondary electrons under the control of the primary electrons at the predetermined plane to produce a secondary electron replica of the primary electron image, focusing the secondary electron replica upon a third predetermined plane to produce a distortion corrected electrostatic replica of the image, and scanning the electrostatic replica to produce electrical signalling energy.

9. Apparatus for transmitting images of an object to a distance comprising a first screen adapted to emit primary electrons under the action of incident radiation, means for forming an image of an object to be transmitted upon said screen to cause primary electrons to be emitted from said screen, means for accelerating said primary electrons towards a target electrode, means for focusing said primary electrons upon said target electrode, said target electrode being adapted to emit secondary electrons under the impact of said primary electrons, means to accelerate the emitted secondary electrons towards a mosaic screen, means for focusing the secondary electrons upon said mosaic screen to form an electrostatic image thereon, and means for scanning said screen to generate picture signals for transmission.

10. Apparatus as claimed in claim 9, wherein said means for scanning said screen comprise a cathode ray gun and means for causing the cathode ray to scan the screen.

11. Apparatus as claimed in claim 9 and comprising, in addition, a plurality of target electrodes, means for accelerating electrons from one target to the next, and means for focusing electrons from one target on to the next.

12. Apparatus for transmitting images of an object comprising means for producing an optical image of the object, a light sensitive area in the path of the optical image for producing a primary electron stream forming an electronic image of the produced optical image, secondary emission means responsive to the primary electron flow for producing an intensified electron image from the primary electron image, and means for converting the electron image into an electrostatic image of the original optical image.

13. Apparatus for transmitting images of an object comprising means for producing an optical image of the object, a light sensitive area in the path of the optical image for producing a primary electron stream forming an electronic image of the produced optical image, secondary emission means responsive to the primary electron flow for producing an intensified electron image from the primary electron image, means for converting the electron image into an electrostatic image of the original optical image, and means for scanning the electrostatic image to produce electrical signalling energy.

14. Apparatus for transmitting images of an object comprising means for producing an optical image of the object, means for producing a primary electron image from the optical image, means for focusing the electron image upon a predetermined plane, means for producing a secondary electron replica of the primary electron image at the predetermined plane, and means for focusing the produced replica upon a second predetermined plane to produce an electrostatic replica of the secondary electron replica.

15. Apparatus for transmitting images of an object comprising means for producing an optical image of the object, means for producing a primary electron image from the optical image, means for focusing the electron image upon a predetermined plane, means for producing a secondary electron replica of the primary electron image at the predetermined plane, means for focusing the produced replica upon a second predetermined plane to produce an electrostatic replica of the secondary electron replica, and means for scanning the electrostatic replica to produce electrical signalling energy.

16. Apparatus for transmitting images of an object comprising means for producing an optical image of the object, means for producing a primary electron image from the optical image, means for electrostatically and electromagnetically focusing the electron image upon a predetermined plane, means for producing a secondary electron replica of the primary electron image at the predetermined plane, and means for electrostatically and electromagnetically focusing the produced replica upon a second predetermined plane to produce an electrostatic replica of the secondary electron replica.

17. Apparatus for transmitting images of an object comprising means for producing an optical image of the object, means for producing a primary electron image from the optical image, means for electrostatically and electromagnetically focusing the electron image upon a predetermined plane, means for producing a secondary electron replica of the primary electron image at the predetermined plane, means for electrostatically and electromagnetically focusing the produced replica upon a second predetermined plane to produce an electrostatic replica of the secondary electron replica, and means for scanning the electrostatic replica to produce electrical signalling energy.

18. Apparatus for transmitting images of an object comprising means for producing an optical image of the object, means for producing a primary electron image from the optical image, means for electrostatically and electromagnetically focusing the electron image upon a predetermined plane, means for producing a secondary electron replica of the primary electron image at the predetermined plane, means for electrostatically and electromagnetically focusing the secondary electron replica upon a second predetermined plane to produce a second secondary electron replica of the image, and means for electrostatically and electromagnetically focusing the second secondary electron replica upon a third predetermined plane to produce an electrostatic replica to produce electrical signalling energy.

19. Apparatus for transmitting images of an object comprising means for producing an optical image of the object on a predetermined plane, means for producing a primary electron image from the optical image, means for focusing the electron image upon a predetermined plane in non-parallel relation to the first named plane, means for producing a secondary electron replica of the primary electron image, means for focusing the secondary electron replica upon a third predetermined plane to produce a distortion corrected electrostatic replica of the image, and means for scanning the electrostatic replica to produce electrical signalling energy.

HANS GERHARD LUBSZYNSKI.